United States Patent [19]

Bucknavich

[11] 4,093,011
[45] June 6, 1978

[54] REMOVABLE THREADED INSERT

[76] Inventor: James L. Bucknavich, 8503 Sherman, Warren, Mich. 48089

[21] Appl. No.: 749,461

[22] Filed: Dec. 10, 1976

[51] Int. Cl.² .............................................. F16B 39/02
[52] U.S. Cl. ..................................................... 151/57
[58] Field of Search ..................... 151/57, 54, 55, 23, 151/41.73, 8, 44, 33, 68, 70, 37; 85/23; 29/264, 263, 256, 258

[56] References Cited

U.S. PATENT DOCUMENTS

| | | | |
|---|---|---|---|
| 2,203,219 | 6/1940 | Jackman | 151/57 |
| 2,446,846 | 8/1948 | Noble | 151/54 |
| 2,788,830 | 4/1957 | Rosan | 151/54 X |
| 2,916,813 | 12/1959 | Belanger | 29/264 X |
| 3,034,464 | 5/1962 | Hrabal | 29/256 X |
| 3,039,508 | 6/1962 | Greene | 151/23 |
| 3,212,796 | 10/1965 | Neuschotz | 151/57 X |

Primary Examiner—Ramon S. Britts
Attorney, Agent, or Firm—Remy J. VanOphem

[57] ABSTRACT

A threaded insert is adapted to be secured in threaded engagement with an anchoring structure by use of locking elements carried by pockets formed in the insert along the periphery thereof contiguous with surfaces of the surrounding anchoring structure, the locking elements being formed with serrations extending out of the pockets and adapted to be forced into the anchoring structure to securely lock the insert against rotation relative thereto. A small threaded bore is also provided in each locking element which serves to facilitate removal of the locking element when a threaded element is advanced into the bore and into engagement with the pocket surface so as to force the locking element out of the pocket to allow removal of the insert. The configuration of the locking element is such that any tendency for rotation of the locking element creates increasing locking engagement with the surrounding anchoring material.

6 Claims, 4 Drawing Figures

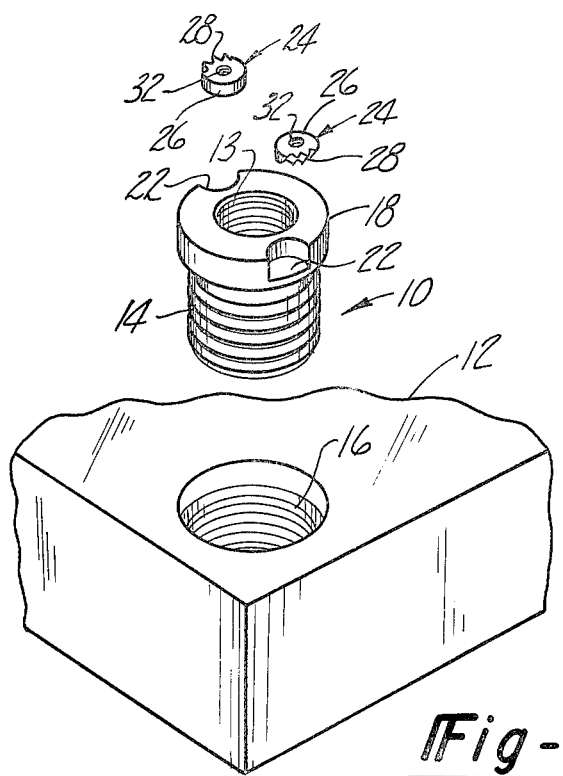
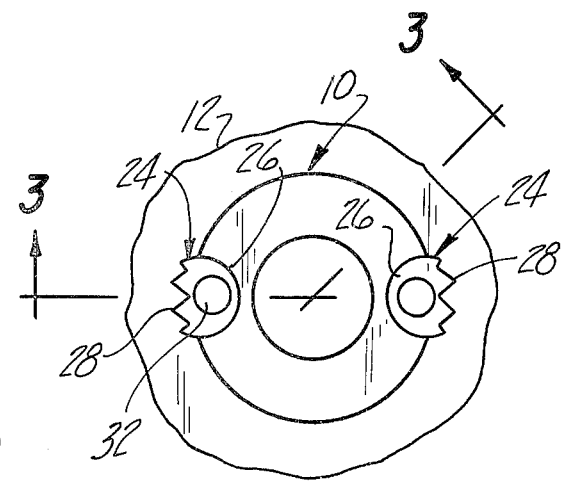
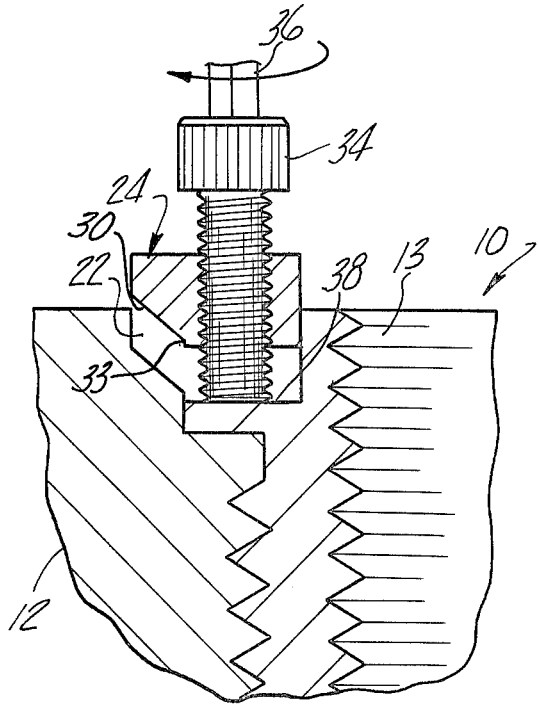
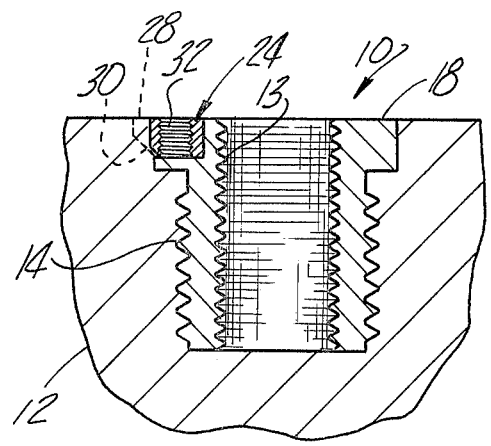
Fig-1
Fig-2
Fig-3
Fig-4

REMOVABLE THREADED INSERT

BACKGROUND OF THE INVENTION

1. Field of the Invention

This invention concerns threaded inserts of the type adapted to be secured to an anchoring structure.

2. Description of the Prior Art

Threaded inserts of the type formed of hardened steel and adapted to be anchored in an anchoring structure of softer material such as aluminum have been widely used in such applications as aircraft structures and similar structures formed of materials such as aluminum or plastic having inadequate hardness to directly receive threaded fasteners, particularly the fine pitch machine threads. These threaded inserts typically are adapted to be threaded into a bore in the anchoring structure and then locked into position by means of a serrated locking ring which is adapted to mate with the threaded insert and to be forced into the surrounding anchoring structure causing cold flow of the anchoring structure material so as to secure the locking ring and thereby the insert against rotation in the anchoring structure. The serrations provide a means for allowing the forcing of the locking ring into the surrounding anchoring structure material by cold flow and also allow for relatively great torsional strength between the locking ring and the threaded insert. The cold flow of the anchoring structure material firmly secures the locking ring in position to prevent it from becoming dislodged.

An alternative approach disclosed in U.S. Pat. No. 3,270,792 involves the use of keys located at the periphery of the insert and adapted to be forced through corresponding slots in the insert and deform the surrounding threads to provide the locking function.

A drawback to these arrangements exists in that no practical, easily implemented technique is possible for removing an insert so as to allow replacement, as for example with another insert having a differing size threaded bore; or to remove a broken bolt. This drawback is created by the small cross-sectional area and location of the locking rings and keys making engagement with removal tools difficult. In the case of locking rings, even if the locking ring could be removed, the serrations of the locking ring on the new insert may not be firmly secured due to the presence of the old impressions left by the locking ring of the original insert. Thus, drilling out of the old bore and replacement with a larger size insert would be necessary.

Therefore, the object of the present invention is to provide such a threaded insert which is easily removable and replaceable with another insert of the same size, without compromising the effectiveness of either the original or the replacement installation.

SUMMARY OF THE INVENTION

These and other objects which will become apparent upon a reading of the specification and claims is accomplished by providing a threaded insert which is provided with one or more, preferably two, pockets formed on that portion of the insert which is to be contiguous with the anchoring material. Locking elements are provided to be fit into these pockets and having a portion thereof extending out of the pocket and configured so as to be able to be forced into the anchoring structure material, this configuration in the preferred embodiment provided by a series of serrations formed on the outer edge of the loking element. The locking elements are also provided with through threaded bores adapted to receive corresponding cap-screws so as to enable the locking elements to be forced from the pockets by advancing the capscrew into engagement with the pocket surface. The portion of the locking elements seated in the pockets is arcuate so as to create an increase in the engagement forces under torsional loads, while the underside of the locking element is chamfered so as to be located in the pocket before forcing the serrations into the anchoring material.

BRIEF DESCRIPTION OF THE DRAWINGS

FIG. 1 is an exploded view of an installation of a threaded insert according to the present invention.

FIG. 2 is a plan view of the installation shown in FIG. 1.

FIG. 3 is a view of the Section 3—3 taken in FIG. 2.

FIG. 4 is an enlarged view of a portion of the section shown in FIG. 3 with one of the locking elements shown as being removed.

DETAILED DESCRIPTION

In the following detailed description a specific embodiment will be described in accordance with the requirements of 35 U.S.C. 112 and particular terminology utilized for the sake of clarity, but the same is not intended to be so limited as the invention is capable of many forms and variations within the scope of the appended claims.

Referring to the drawings, an example of one form of the threaded insert 10 typically made of a relatively hard material such as steel, is shown installed in an anchoring structure 12; typically of a softer material such as aluminum or plastic. The threaded insert 10 includes a body portion 14 which has external threads machined thereon adapted to mate with corresponding threads formed in a bore 16 machined into the anchoring structure 12 so as to provide means for creating a threaded engagement therebetween when installed as shown which in turn secures the threaded insert 10 to the anchoring structure 12.

An internally threaded bore 13 is provided for securement of another part to the anchoring structure 12, although an externally threaded stud could also be provided.

The threaded insert 10 also includes a shoulder 18 mating with a counterbore 20 formed in the anchoring structure 12 and seating thereon in the installed position as shown.

The threaded insert 10 has formed in the shoulder 18 a pair of arcuately shaped pockets 22 formed opposite each other on the outer periphery thereof so as to be adjacent the contiguous portion of anchoring structure 12. Disposed in the pockets 22 are a pair of locking elements 24 each configured with a correspondingly shaped arcuate portion 26 and also including a serrated portion 28 adapted to extend out of said pockets 22 and formed of relatively hard material such as steel so as to be able to be forced into the softer material of the anchoring structure 12.

A chamfer 30 and pilot lead 33 (FIG. 4) are machined into the underside of the serrated portion 28 to enable the locking element 24 to be located in the pocket 22 and also to be guided into the pocket 22 during seating of the serrations into the anchoring structure material. This operation may be carried out by tapping the locking element 24 with a hammer.

When thus installed, the locking element 24 provides a means for preventing shear movement between the contiguous portions of the threaded insert 10 and the anchoring structure 12 which, in cooperation with the threaded engagement therebetween, entirely prevents relative movement.

Also provided is a through threaded bore 32 in each locking element 24 in the portion above the pocket 22 so as to provide a means for engaging the locking element 24 and the pocket surface 38 to force the locking element 24 out of the pocket 22 after installation thereof by advancing a capscrew 34 by an Allen wrench 36 into the bore 32 and into engagement with the surface 38 of the pocket 22. The pocket surface 38 thereby provides a reaction surface for the removal of the locking element 24.

After removal, the insert 10 can then be unthreaded and a new insert installed, taking care that the pockets 22 are aligned at a position displaced from the original impressions made by the serrations 28, and the locking elements 24 then reinstalled in the new location.

In addition to the locking elements 24 being more securely retained against dislodgement than by simple keys by virtue of the serrations causing cold flow of the anchoring structure material, this locking element 24 configuration also produces a stronger connection between the threaded insert 10 and the surrounding anchor structure, since the center of radius of the arcuate portion 26 lies on the portion 28 of the locking element 24 extending into the anchoring structure, so as to tend to create a rotation of the locking element 24 in the pocket 22. This in turn causes the serrations to tend to be rotated further into the anchoring structure material, producing a tighter engagement of the serrations 28 with the anchoring structure 12.

This approach also allows simplified removal of a broken bolt, which usually requires drilling out of the broken shank. With the present invention, simply removing the insert with the broken shank solves the problem.

While the particular embodiment shows a male threaded insert with a threaded bore, it is of course possible to apply this principle to all combinations of male - female threaded inserts and anchoring structure.

Similarly, many variations of the exact configuration of the locking element is possible, as well as the number and locations thereof, although two locking elements at opposed locations would be adequate for most applications.

What is claimed is:

1. In combination a threaded insert secured to an anchoring structure, each having portions thereof contiguous to each other and a locking element for locking said insert to said anchoring structure, comprising:

an axially extending pocket open at one side and having an axially inner end defining a reaction surface, said pocket formed in said insert along said portion thereof contiguous to said anchoring structure;

said locking element configured to be disposed in said pocket and seated against said reaction surface formed in said pocket and having a portion thereof extending out of said pocket and having a configuration adapted to be forced into said anchoring structure material to secure said locking element to said anchoring structure and prevent relative shearing movement between said contiguous portions of said insert and said anchoring structure; and means for engaging said locking element and said reaction surface and forcing said locking element out of said pocket whereby said insert may be released from said anchoring structure.

2. The arrangement according to claim 1 wherein said means for engaging said locking element and said reaction surfaces includes a through threaded bore formed in said locking element in the region of said reaction surface.

3. The locking arrangement according to claim 2 wherein said reaction surface comprises an integral pocket seat surface.

4. The locking arrangement according to claim 1 wherein said portion of said locking element extending out of said pocket has serrations formed thereon adapted to be forced into said anchoring structure material.

5. The locking arrangement according to claim 1 wherein said portion of said locking element extending out of said pocket is chamfered on an underside portion thereof to enable locating of said portion of said locking element adapted to be disposed in said pocket prior to forcing of said portion extending out of said pocket into said anchoring structure material.

6. The locking arrangement according to claim 1 wherein said pocket and said portion of said locking element configured to be disposed in said pocket are arcuately configured, whereby increased engagement forces are produced by any tendency for said locking element to rotate in said seat.

* * * * *